United States Patent

[11] 3,561,347

| [72] | Inventor | Clarence E. Ellis<br>Red Rock, Okla. 74651 |
|---|---|---|
| [21] | Appl. No. | 821,343 |
| [22] | Filed | May 2, 1969 |
| [45] | Patented | Feb. 9, 1971 |

[54] COOKER FOR GRAIN OR THE LIKE HAVING PRE-HEATER
6 Claims, 2 Drawing Figs.

| [52] | U.S. Cl. | 99/237 |
|---|---|---|
| [51] | Int. Cl. | A23l 1/10 |
| [50] | Field of Search | 165/107, 104, 120, 154, 157; 99/235, 236, 249, 251, 263, 267, 216, 237 |

[56] References Cited
UNITED STATES PATENTS

| RE23,777 | 1/1954 | Robinson | 165/154X |
|---|---|---|---|
| 805,652 | 11/1905 | Leperche et al. | 99/263X |
| 839,322 | 12/1906 | Rock et al. | 165/154X |
| 1,574,210 | 2/1926 | Spaulding | 99/237UX |
| 1,888,472 | 11/1932 | Rohde | 99/249UX |
| 2,746,375 | 5/1956 | Abbott et al. | 99/263 |
| 3,385,200 | 5/1968 | Ellis | 99/237 |

*Primary Examiner*—Billy J. Wilhite
*Attorney*—Lawrence L. Colbert

ABSTRACT: A grain cooker receives the grain at the top thereof in a preheating zone which derives heat from otherwise wasted boiler exhaust. In the preheating zone, the grain pores are opened preparatory to proper cooking. The preheated grain then gravitates through a main heating zone around a boiler where rising steam contacts the open-pored grain and is immediately absorbed. Cooked grain discharges at the bottom of the cooker.

PATENTED FEB 9 1971 3,561,347

COOKER FOR GRAIN OR THE LIKE HAVING PREHEATER

BACKGROUND OF THE INVENTION

The invention is an improvement on the U.S. Pat. No. 3,385,200, issued May 28, 1968 to Ellis. In that patent, raw grain is delivered to the top of a cooking zone and gravitates immediately to a high temperature region surrounding the boiler. Steam is injected in the main cooking zone and the cooked produce is discharged at the bottom of the apparatus by an auger.

It has been found that for more thorough and uniform grain processing a preheating step to open the grain pores prior to primary cooking is highly desirable. More uniform gelatinization and constant moisture factor are obtained even though incoming loads of grain may vary considerably in quality. The preheating means can economically be formed of an integral part of the grain cooker and may utilize normally wasted boiler exhaust with an absolute minimum of plumbing. The overall results produced by the cooker thus constructed are far superior to the results where no preheating is provided for. The improved cooker offers absolute control of heat and moisture. The preheated open-pored grain absorbs rising steam immediately, putting moisture and heat inside the kernel where it is needed for thorough cooking. Heat and steam are separately controlled so that moisture can be adjusted without effecting gelatinization. Making the preheater an integral part of the cooker allows full usage of radiated heat and eliminates normal plumbing line losses and this greatly reduces overall horsepower and fuel requirements.

BRIEF DESCRIPTION OF DRAWING FIGURES

DETAILED DESCRIPTION OF PREFERRED EMBODIMENT

Figure 1:
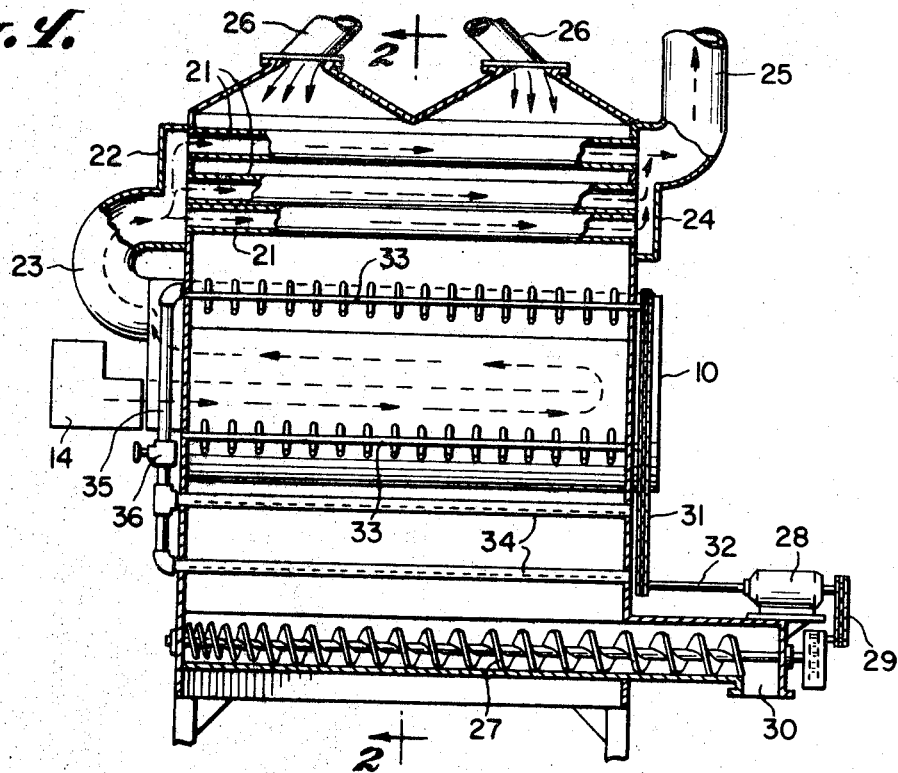
FIG. 1 is a vertical sectional view through a grain cooker embodying the present invention, with parts in elevation.

Referring to the drawings in detail, wherein like numerals designate like parts, the numeral 10 designates a horizontal cylindrical boiler generally as depicted in U.S. Pat. No. 3,385,200 and having a horizontal divider wall 11 separating a lower fire chamber 12 from an upper steam chamber 13. Conventional burner and draft means 14, FIG. 1, service the fire chamber 12 and these elements may be conventional.

Figure 2:
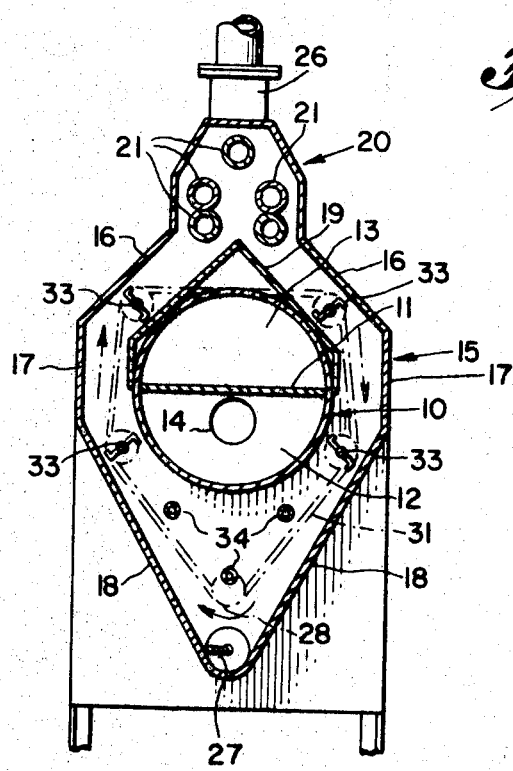
FIG. 2 is a vertical section taken on line 2-2 of FIG. 1.

The boiler 10 is surrounded by an exterior casing 15 as shown in FIG. 2 having upper sloping walls 16, intermediate vertical walls 17 and lower sloping walls 18, collectively forming passages for the downward movement of grain on opposite sides of the boiler 10. The top of the boiler is covered by a deflector or abrasion shield 19 whose sidewalls are preferably parallel to the walls 16.

A preheating zone enclosure 20 of reduced cross section is formed integrally upon the casing 15 and above the shield 19. This enclosure receives plural parallel preheating pipes 21 some of which may be in direct contact as shown. At corresponding ends, these preheating pipes are connected with an inlet header 22 which receives normally wasted boiler exhaust gases through an elbow 23. The preheating zone within the enclosure 20 also receives heat radiated from the top of the boiler 10 as well as heat from the pipes 21. The opposite ends of the pipes 21 lead to an exhaust header 24 having a stack 25 to atmosphere. As shown, suitable grain inlets 26 deliver the product to the preheating zone within the enclosure 20.

At the bottom of the casing 15, a grain discharge auger 27 is provided substantially as shown in the aforementioned patent and this auger is driven by a suitable motor 28 and gearing 29, the auger delivering cooked grain to a gravity outlet 30. Further gearing 31 driven by the motor shaft 32 operates a plurality of grain agitators 33 which are arranged around the boiler 10 in circumferentially spaced relation and are also arranged within the two flow channels for the grain defined by the walls of casing 15 and the boiler and its shield 19. All grain passing downwardly through the cooker is therefore subjected to the agitating action of these several elements 33. Similar agitators are disclosed in the aforementioned Ellis patent.

Below the boiler 10 near the grain exit zone are plural steam injection pipes 34 which are perforated throughout their lengths. At corresponding ends, FIG. 1, these pipes receive steam from a header pipe 35 having a valve 36 therein. The header pipe 35 communicates with the steam chamber 13, as shown. The steam emitted from the pipes 34 will tend to rise toward and on opposite sides of the boiler 10 to contact the hot open-pored grain as the latter gravitates downwardly.

In use, uncooked grain is delivered more-or-less continuously through the inlets 26 to the preheating zone within the upper enclosure 20. The boiler 10 is being fired by the means 14 and steam is developed in the chest or chamber 13 and is emitted from the perforated pipes 34 and tends to rise upwardly around both sides of the boiler 10 in two flow paths and in opposition to the downward flow of grain. The motor 28 is also operating to drive the agitators 33 and discharge auger 27.

Boiler exhaust, as indicated by the arrows in FIG. 1, discharges through the elbow 23 to the preheater pipes 21 and in so doing gives up heat to the incoming grain in the preheating zone defined by the enclosure 20. Radiation from the top of the boiler 10 also assists in the preheating operation. This opens the pores of the grain and begins the cooking even before the grain reaches the primary cooking zone on opposite sides of the boiler 10. The rising steam contacts the hot open-pored grain and is immediately absorbed putting moisture and heat inside of the grain kernel where it is needed. The constant agitation of the grain assures even cooking and even flow without clogging the apparatus. The infeed and outflow of the product with uniform cooking may be substantially continuous and absolute control of heat and moisture can be maintained at all times. The apparatus is most efficient and economical in terms of heat loss and fuel consumption and the physical construction is extremely simple and durable. The many advantages of the invention should be apparent to those skilled in the art.

I claim:

1. A grain cooker comprising a steam generator having a fire chamber and a steam chamber in separated relation, a casing surrounding said generator in spaced relation and defining with the generator gravitational flow passages for grain on opposite sides of the generator, said flow passages merging into a single zone below the generator, steam injection means in said single zone and communicating with said steam chamber, a preheating enclosure on said casing above the generator, preheating conduit means within the preheating enclosure and communicating with the fire chamber, product infeed means at the top of the preheating enclosure, and product discharge means at the bottom of said casing and single zone and below the steam injection means.

2. The structure of claim 1, and agitator means within said casing on opposite sides of said generator and within said gravitational flow passages.

3. The structure of claim 2, and said steam injection means comprising plural spaced perforated pipes within and extending through said zone below said generator and agitator means.

4. The structure of claim 1, wherein said preheating enclosure is an integral part of said casing and is substantially reduced in cross-sectional size in comparison to the cross-sectional size of the casing adjacent said generator.

5. The structure of claim 4, and said preheating conduit means comprises a plurality of pipes extending through said preheating enclosure and having corresponding ends connected with an exhaust conduit leading from said fire chamber, the opposite corresponding ends of said pipes connected with exhaust stack means.

6. The structure of claim 1, and said produce product discharge means comprising a substantially horizontal auger at the bottom of said casing.